US008315620B1

(12) United States Patent
Williamson et al.

(10) Patent No.: US 8,315,620 B1
(45) Date of Patent: Nov. 20, 2012

(54) METHODS AND APPARATUS TO ASSOCIATE A MOBILE DEVICE WITH A PANELIST PROFILE

(75) Inventors: Ralph K. Williamson, Plano, TX (US); Mohamad Hannaoui, Concord, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/117,657

(22) Filed: May 27, 2011

(51) Int. Cl.
H04M 3/00 (2006.01)
(52) U.S. Cl. ...................................................... 455/418
(58) Field of Classification Search .................. 455/560, 455/426, 555, 445, 553, 554, 432, 427, 430, 455/12.1, 428, 56.1, 418
See application file for complete search history.

(56) References Cited

U.S. PATENT DOCUMENTS

| 5,483,276 | A | 1/1996 | Brooks et al. |
| 5,603,084 | A | 2/1997 | Henry, Jr. et al. |
| 5,678,170 | A | 10/1997 | Grube et al. |
| 5,857,190 | A | 1/1999 | Brown |
| 6,285,879 | B1* | 9/2001 | Lechner et al. ............ 455/432.3 |
| 6,311,073 | B1* | 10/2001 | Charpentier et al. ......... 455/560 |
| 6,366,773 | B1* | 4/2002 | Ihara et al. .................... 455/419 |
| 6,393,300 | B1* | 5/2002 | Doutheau et al. ............. 455/555 |
| 6,434,385 | B1* | 8/2002 | Aucoeur ....................... 455/430 |
| 6,467,089 | B1 | 10/2002 | Aust et al. |
| 6,493,327 | B1 | 12/2002 | Fingerhut |
| 6,516,189 | B1 | 2/2003 | Frangione et al. |
| 6,622,116 | B2 | 9/2003 | Skinner et al. |
| 6,714,778 | B2 | 3/2004 | Nykanen et al. |
| 6,745,011 | B1 | 6/2004 | Hendrickson et al. |
| 6,900,737 | B1 | 5/2005 | Ardalan et al. |
| 6,939,233 | B2 | 9/2005 | Emmerson |
| 7,224,974 | B2 | 5/2007 | Benco et al. |
| 7,343,317 | B2 | 3/2008 | Jokinen et al. |
| 7,502,367 | B2 | 3/2009 | Becher et al. |
| 7,506,059 | B2 | 3/2009 | Mulligan |
| 7,587,473 | B2 | 9/2009 | Benco et al. |
| 7,587,732 | B2 | 9/2009 | Wright et al. |
| 7,849,154 | B2 | 12/2010 | Grecco et al. |
| 8,064,951 | B2* | 11/2011 | Woodson et al. ............. 455/555 |
| 8,169,952 | B2* | 5/2012 | Woodson et al. ............. 370/328 |
| 8,180,393 | B2* | 5/2012 | Phillips et al. ................ 455/555 |
| 2001/0003828 | A1 | 6/2001 | Peterson et al. |
| 2001/0037407 | A1 | 11/2001 | Dragulev et al. |
| 2001/0052077 | A1 | 12/2001 | Fung et al. |
| 2002/0019985 | A1 | 2/2002 | Fuccello et al. |
| 2002/0029867 | A1 | 3/2002 | Sankuratripati et al. |
| 2002/0143961 | A1 | 10/2002 | Siegel et al. |
| 2003/0023336 | A1 | 1/2003 | Kriedler et al. |

(Continued)

FOREIGN PATENT DOCUMENTS

GB 2455965 1/2010

(Continued)

*Primary Examiner* — Melody Mehrpour
(74) *Attorney, Agent, or Firm* — Hanley, Flight & Zimmerman, LLC

(57) ABSTRACT

Methods and apparatus are disclosed to associate a mobile device with a panelist profile. An example method includes initializing a metering application on the mobile device to operate with partial functionality, parsing a message log with the metering application to identify an installation message, extracting a telephone number from the installation message and saving to a memory of the mobile device, sending an initialization message based on the extracted telephone number to prompt an authorization message, and enabling full functionality of the metering application in response to receiving the authorization message.

13 Claims, 9 Drawing Sheets

U.S. PATENT DOCUMENTS

| | | |
|---|---|---|
| 2003/0041125 A1 | 2/2003 | Salomon |
| 2003/0065777 A1 | 4/2003 | Mattila et al. |
| 2003/0074400 A1 | 4/2003 | Brooks et al. |
| 2003/0093311 A1 | 5/2003 | Knowlson |
| 2003/0233336 A1 | 12/2003 | Clark |
| 2003/0233461 A1 | 12/2003 | Mariblanca-Nieves et al. |
| 2004/0039814 A1 | 2/2004 | Crabtree et al. |
| 2004/0068502 A1 | 4/2004 | Vogedes et al. |
| 2004/0103142 A1 | 5/2004 | Becher et al. |
| 2004/0103143 A1 | 5/2004 | Chikada et al. |
| 2004/0117857 A1 | 6/2004 | Bisdikian et al. |
| 2004/0186882 A1 | 9/2004 | Ting |
| 2004/0198234 A1 | 10/2004 | Wacker et al. |
| 2005/0148335 A1 | 7/2005 | Benco et al. |
| 2005/0204379 A1 | 9/2005 | Yamamori |
| 2005/0213511 A1 | 9/2005 | Reece, Jr. et al. |
| 2005/0213544 A1 | 9/2005 | Kikuchi et al. |
| 2006/0167971 A1 | 7/2006 | Breiner |
| 2006/0168250 A1 | 7/2006 | Feng et al. |
| 2006/0173974 A1 | 8/2006 | Tang |
| 2006/0277271 A1 | 12/2006 | Morse et al. |
| 2006/0277308 A1 | 12/2006 | Morse et al. |
| 2006/0294885 | 12/2006 | Grecco et al. |
| 2007/0073799 A1 | 3/2007 | Adjali et al. |
| 2007/0192486 A1 | 8/2007 | Wilson et al. |
| 2007/0203791 A1 | 8/2007 | Kohl et al. |
| 2008/0010133 A1 | 1/2008 | Pyhalammi et al. |
| 2008/0022294 A1 | 1/2008 | Perrin et al. |
| 2008/0091489 A1 | 4/2008 | LaRock et al. |
| 2008/0102884 A1 | 5/2008 | Song et al. |

FOREIGN PATENT DOCUMENTS

| | | |
|---|---|---|
| WO | 2006135205 | 12/2006 |

\* cited by examiner

US 8,315,620 B1

METHODS AND APPARATUS TO ASSOCIATE A MOBILE DEVICE WITH A PANELIST PROFILE

FIELD OF THE DISCLOSURE

This disclosure relates generally to mobile device monitoring, and, more particularly, to methods and apparatus to associate a mobile device with a panelist profile.

BACKGROUND

In recent years, mobile applications (sometimes referred to as "apps") have become a ubiquitous aspect of mobile devices, such as wireless telephones. Wireless service providers, wireless device manufacturers, and/or others may develop and/or distribute mobile applications to facilitate one or more features for users of the mobile devices. Additionally, one or more third parties may develop and/or distribute mobile applications to operate on mobile devices that provide one or more services and/or functions.

Services and/or functions facilitated by the mobile applications may include, but are not limited to entertainment (e.g., games, movies), banking (e.g., balance management, money transfers), navigation (e.g., maps, directions), photography, and/or social media. An operating system of the mobile device may execute the mobile application and permit access to one or more native functions of the mobile device. Native functions of the mobile device may include, but are not limited to, wireless radios for transmitting and receiving broadcast radio, voice information and/or data information, global positioning satellite functions to identify the location of the mobile device, camera hardware to facilitate photography and/or video recording, light sensor(s), speakers and/or headphones to facilitate audio output, and/or microphones to facilitate audio capture.

In some examples, the mobile applications provided by wireless service providers, wireless device manufacturers and/or other parties are distributed to consumers through a wireless application market. For example, the Android operating system includes an application market accessible to users of Android® devices to allow for searching, reviewing, rating, purchasing, and/or installing of mobile applications. In another example, wireless devices manufactured by Apple® route users to an AppStore through an interface named iTunes® and/or facilitate an AppStore interface on the device to allow for sending, receiving, rating, purchasing and/or installing applications. In still other examples, other parties may provide users of mobile devices a uniform resource identifier (URI) to which the mobile device may navigate and install one or more mobile applications.

DETAILED DESCRIPTION

Figure 1:
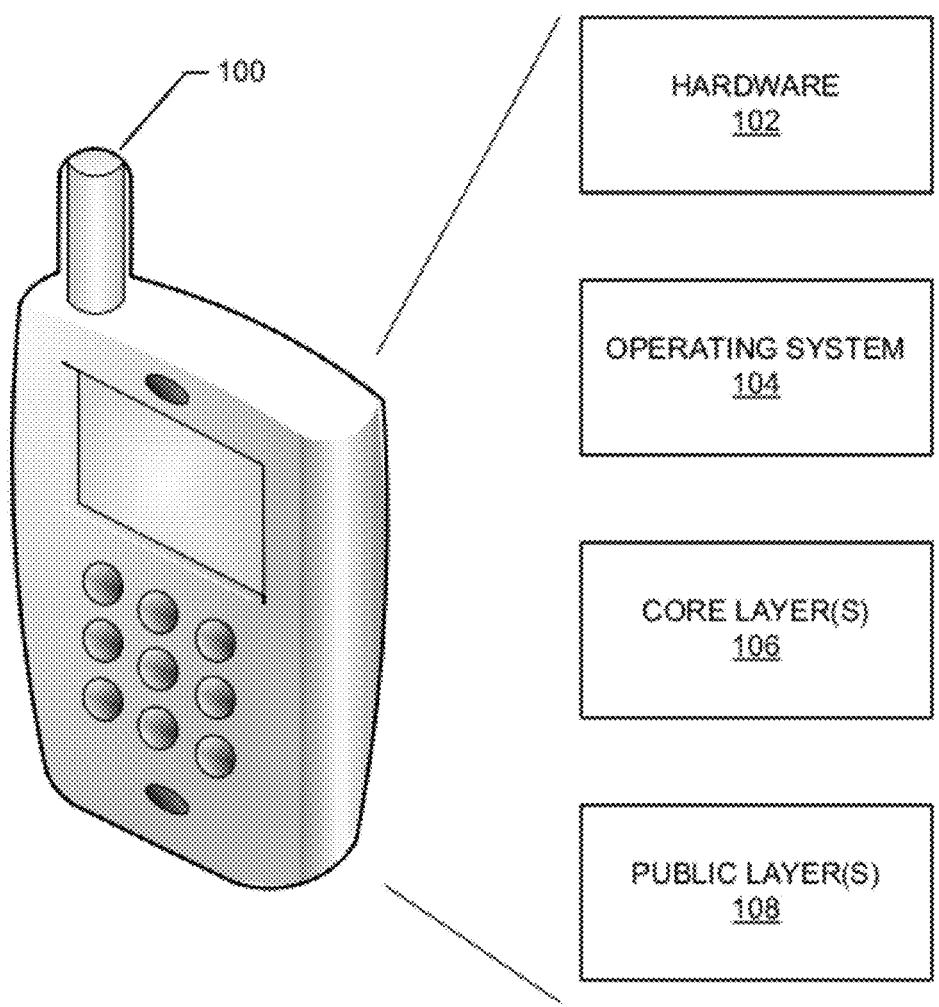
FIG. 1 is a schematic illustration of an example mobile device having hardware and an operating system.

Methods and apparatus are disclosed to associate a mobile device with a panelist profile. An example method includes initializing a metering application on the mobile device to operate with partial functionality, parsing a message log with the metering application to identify an installation message, extracting a telephone number from the installation message and saving to a memory of the mobile device, sending an initialization message based on the extracted telephone number to prompt an authorization message, and enabling full functionality of the metering application in response to receiving the authorization message.

Some mobile applications have been developed to perform on-device metering (ODM) that uses one or more facilities of the mobile device to detect and/or record panelist activity. In some disclosed examples, the ODM employs global positioning satellite (GPS) functions to identify where the panelist is located and/or employs a microphone of the mobile device to sample audio information to which the panelist is exposed. In other disclosed examples, the ODM monitors how the panelist interacts with the mobile device, such as monitoring which web sites the panelist visits, time-of-day usage, key presses, mobile device functions (e.g., placing/receiving calls, text messages, etc.), collection of environmental details (e.g., local lighting conditions, local audio conditions, current speed, audio volumes, audio samples, etc.), and/or accessing one or more sensors of the mobile device to record environmental details. Market researchers and/or other parties/entities that seek panelist behavior information cooperate with willing participants that agree to be monitored with an ODM application. The information collected by the market researchers can be used to, in part, project (e.g., extrapolate using statistical method(s)) usage and/or media exposure behaviors detected in the monitored panelist demographic onto a larger population of interest.

However, to develop such statistical projections, the participating panelists should be correctly and conveniently identified. If the candidate panelist finds the data entry too cumbersome, the opportunity to convert that candidate panelist to a confirmed (participating) panelist may be lost. As a result, persons are recruited to participate in a panel. Such persons ("candidate panelists") are asked to register with a monitoring system. As part of that process, the candidate panelist may be asked to provide demographics information (e.g., income, gender, race, etc.) and/or other identification information (name, e-mail, etc.). For example, the panelist's mobile device needs to be associated with some identifier so that the collected data from the ODM application can be associated with the proper panelist. Thus, the process of attempting to recruit a panelist (e.g., convert a candidate panelist to a participating panelist) typically involves collection of a significant amount of data. Moreover, some of the data to be collected may not be easily obtained or immediately known by the candidate panelist. For example, the mobile device might be identified by an international mobile equipment identity (IMEI) number, an electronic serial number (ESN), an international mobile subscriber identity (IMSI) number, etc. not readily known by the candidate panelist. Participation in the panel by the candidate panelist may be thwarted by a lack of interest to take extra steps to identify and/or otherwise locate any such numeric and/or alphanumeric values deemed cumbersome, lengthy or unknown to the candidate panelist. For example, participation may be thwarted because the information to be entered by the candidate panelist is lengthy and/or difficult to obtain (e.g., powering off the phone and removing the battery cover to identify the IMEI number). Active requirements imposed upon a candidate panelist tends to decrease panelist participation due to, in part, adversity to becoming encumbered with configuration tasks.

Example methods, apparatus and/or articles of manufacture disclosure herein overcome such problems by allowing a panelist to provide commonly known device information and then using an application to automatically retrieve less commonly known information such as a phone number or an IMEI number. In such examples, during the candidate panelist information entry (e.g., via their home PC), the panelist provides the phone number (e.g., commonly known information) associated with their mobile device. After such entry, an example ODM server forwards, for example, a short message service (SMS) message to the corresponding mobile device using the provided phone number. The SMS (text) message of such examples includes a link which may be selected to download an ODM application. In examples disclosed herein, to associate a mobile device with a panelist profile, the ODM application transmits a user identifier with the mobile device telephone number back to the ODM server. However, in some circumstances the ODM application operating on the mobile device is at least initially unaware of the telephone number of the mobile device. For example, the mobile device may limit the access of applications to one or more resources of the operating system and/or hardware that do not reveal the telephone number of the mobile device. In some circumstances, one or more security policies of the mobile device limit the ability of the application to access one or more portions of the mobile device, the OS and/or the features thereof. In still other circumstances, the mobile device itself may have no need to have access and/or knowledge of its own phone number because the wireless service provider translates all communication to/from the mobile device using an alternate identifier, such as an IMEI number. In other words, while a mobile device, such as a wireless telephone, is typically associated with a telephone number to allow others to call the mobile device, the association between the telephone number and the number that causes the mobile device to ring may occur within the infrastructure of the wireless service provider. As such, the mobile device and/or the application(s) executing on the mobile device may not have access to or knowledge of the telephone number associated with the mobile device.

FIG. 1 is a schematic illustration of an example mobile device 100 that includes hardware 102, an operating system (OS) 104, one or more core layers 106, and one or more public layers 108. The example hardware 102 of the mobile device 100 may include, but is not limited to, transmitters and receivers to operate within, for example, a general packet radio service (GPRS) network, antenna elements(s), processor(s), sim card(s), digital signal processor(s) (DSPs), memor(ies) (e.g., random access memory, flash memory, etc.), input/output device(s), etc. The example OS 104 of FIG. 1 establishes or enables one or more access policies that allow the example core layer(s) 106 and/or public layer(s) 108 access to the hardware 102 and/or access to function(s) associated with the OS 104. For example, the core layer(s) 106 may have unfettered access to the hardware 102 and/or the OS 104, but the public layer(s) 108 may be limited to a subset of the hardware 102 and/or portions of the OS 104. In some examples, access for the public layer(s) 108 is facilitated by an application programming interface (API) and/or a software development kit (SDK) that provides a user/programmer with function calls. Unfettered access to the hardware 102 and/or OS 104 may be prevented by the manufacturer of the mobile device 100 and/or the service provider for a variety of reasons, such as, for example, maintaining privacy of other data stored on the mobile device 100.

In other examples, the core layer(s) 106 may have access to the telephone associated with the mobile device 100 for the purpose of displaying the telephone number on a display of the mobile device 100. However, the example mobile device 100 may have no other need or utility for the telephone number because, for example, the mobile device 100 and the network on which it operates employs the IMEI number of the mobile device 100 to send and/or receive calls and/or text messages. Caller identification translation (e.g., from phone number to IMEI number) occurs, in some examples, by way of one or more IMEI lookup tables maintained and/or otherwise operated by the service provider of the mobile device 100.

Example methods, apparatus and/or articles of manufacture disclosed herein may be used to cause an ODM application executing on a mobile device to obtain and/or otherwise become aware of the phone number associated with the mobile device. In some examples, after the ODM application obtains and/or otherwise identifies the phone number, the ODM application operating on the mobile device may register with the ODM server without requiring the panelist to perform any further action(s) during an ODM application registration process that associates a user of the mobile device with a panelist profile (e.g., completing the conversion of a candidate panelist to a panelist). In other words, example methods, apparatus and/or articles of manufacture disclosed herein automatically register a mobile device with the ODM server without requiring the panelist to manually identify one or more less commonly known numbers associated with the mobile device that can identify an association between the panelist, the mobile device and/or the information associated with the panelist and mobile device. As described above, while the mobile device has a unique IMEI number and/or an ESN, such example less commonly known numbers are typically unfamiliar to users and/or are relatively lengthy when compared to commonly known seven to ten digit telephone numbers.

Figure 2:
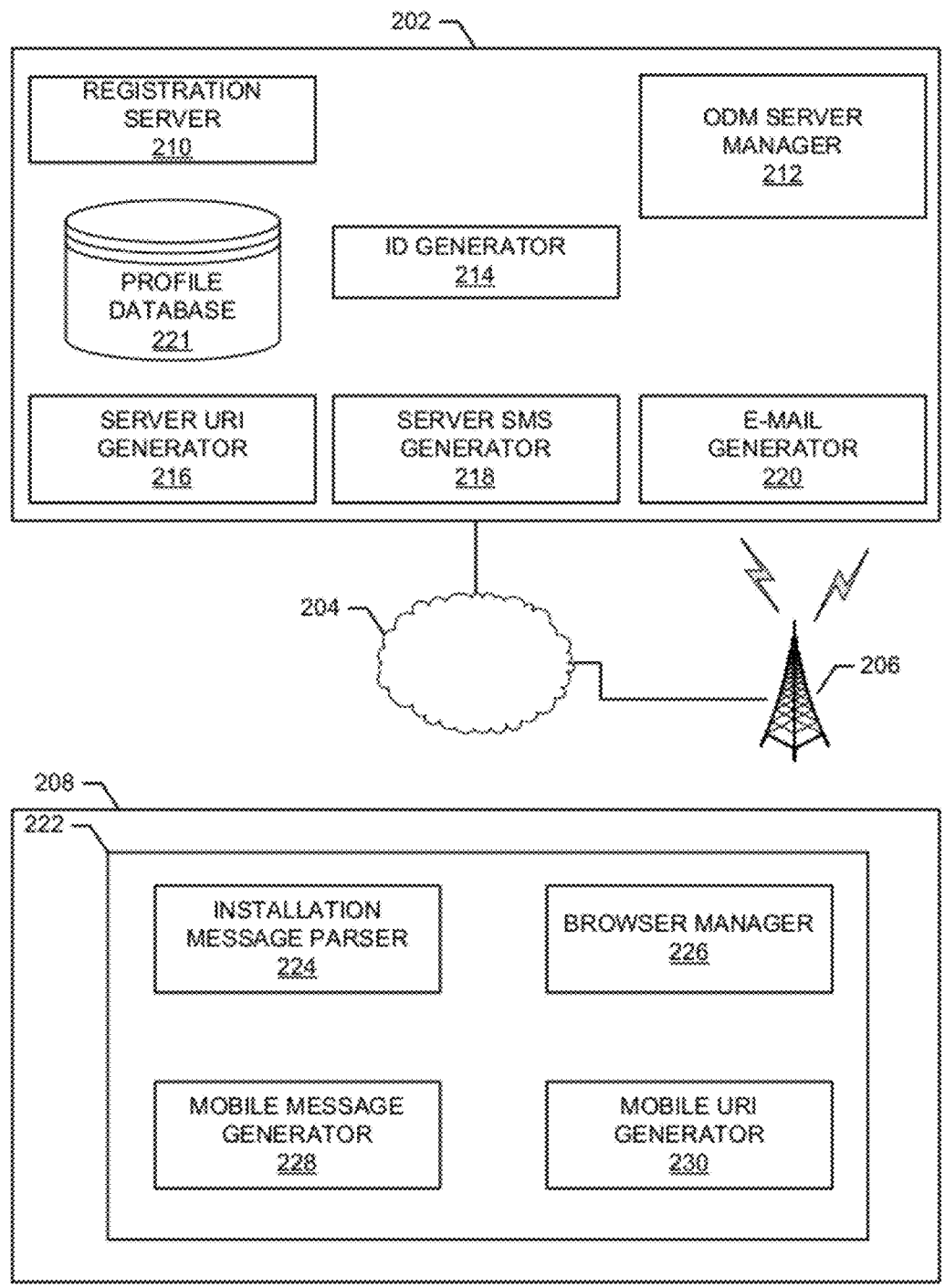
FIG. 2 is a schematic illustration of an example system to facilitate associating a mobile device with a panelist profile.

FIG. 2 is a schematic illustration of an example system 200 to facilitate associating a mobile device with a panelist profile. In the illustrated example of FIG. 2, the system 200 includes an ODM server 202 communicatively connected to a network 204, such as an intranet or the Internet. In the illustrated example, the network 204 is shown coupled to a wireless infrastructure 206 that is associated with one or more wireless service providers. The example of FIG. 2 also includes a mobile device 208 communicatively connected to the wireless infrastructure 206. While, for simplicity of illustration, the illustrated example of FIG. 2 includes a single mobile device 208 and wireless infrastructure 206, any number of mobile devices and/or any number of wireless infrastructure components may operate in the example system 200.

In some examples, the ODM server 202 hosts a web presence (e.g., a web site) via a registration server 210 (which may be separate from the ODM server 202) to collect information from a candidate panelist. Information collected via the example registration server 210 of FIG. 2 includes, but is not limited to, name, address, gender, income, ethnicity, household size (e.g., marital status, number of children, number of pets, etc.), phone number, e-mail address and/or occupation. In the example of FIG. 2, an ODM server manager 212 presents the candidate panelist with instructions, a privacy agreement, a membership agreement, a terms of service agreement and/or other information via the registration server 210. Such information may be related to duties, expectations and/or rewards of participating as a panelist. The example ODM server manager 212 of FIG. 2 may invoke an identification (ID) generator 214 to generate a unique panelist identifier that is associated with the candidate panelist after sufficient relevant information is entered at one or more web pages via the registration server 210, and after an indication of agreement to the privacy, terms of service and/or membership agreement has been received (e.g., an indication that the candidate panelist has clicked on an "agree" button of a web site). As described in further detail below, the ODM application of the illustrated example is only provided to candidate panelists and/or panelists that have agreed to a privacy, terms of service and/or a membership agreement (sometimes referred to herein as "confirmed panelist").

In the illustrated example, a server URI generator 216 generates a custom uniform resource identifier (URI) that includes the panelist phone number entered by the candidate panelist via the registration server 210, and the unique panelist identifier generated by the example ID generator 214. Additionally, a server SMS generator 218 of the illustrated example generates an installation SMS message including the custom URI and a text instruction for transmission to the phone number provided by the panelist. The example server SMS generator 218 of FIG. 2 sends the installation SMS to the mobile device 208 via the network 204 and/or the wireless infrastructure 206.

As described in further detail below, the installation SMS message is generated by the example server SMS generator 218 of the ODM server 202 to include a phone number of the mobile device 208 that was previously provided by the candidate panelist when providing information via the web site facilitated by the example registration server 210 of the ODM server 202 (e.g., information provided by the panelist via their home computer during registration). When the candidate panelist receives the installation SMS message at their mobile device, the candidate panelist is presented with the URI that can be selected to initiate a download operation of the ODM application. An example SMS message including an example text instruction and corresponding URI is:
"Please click the link to download the application. http://odm.companyxyz.com/enroll/
GetApp?pn=4142825176&id=98787253."
In the above example installation SMS message, the phone number of the panelist (i.e., "4142825176") is embedded into the URI and the unique panelist identifier (i.e., "98787253") is embedded into the URI. As used herein, the term URI and URL are interchangeable. In some examples, the unique panelist identifier may be generated as a unique value by the example ID generator 214 before, during or after the candidate panelist enters their information into the web site managed by the registration server 210. In other examples, the ODM server manager 212 invokes an e-mail generator 220 to embed the custom URI generated by the server URI generator 216 and an instruction message in an e-mail message addressed to the candidate panelist. For example, in the event that attempts to transmit SMS messages are unsuccessful or are not deemed reliable, providing an installation e-mail rather than (or in addition to) the installation SMS (text) message may result in a successful installation of the ODM application. As used herein, the term "installation message" includes (e.g., is generic to) an installation SMS message and/or an installation e-mail message.

In response to the candidate panelist selecting the received URI in the installation message via the mobile device 208, an ODM application 222 is downloaded from the ODM server 202 or any other server referred to by the installation message (e.g., a server referenced by the aforementioned example URI). The example application 222 of the illustrated example is installed on the mobile device 208 and includes an installation message parser 224, a browser manager 226, a mobile message generator 228, and a mobile URI generator 230. The example application 222 of the illustrated example invokes the installation message parser 224 to parse the received installation message and extract the phone number and/or the unique panelist identifier. In some examples, the installation message parser 224 identifies an SMS log of the mobile device 208 to retrieve the installation message. In other examples a browser manager 226 identifies a browser history log and/or an e-mail message list of the mobile device 208 to retrieve the installation message. The SMS log may store a historical and/or chronological list of text messages received by the example mobile device 208. Similarly, the browser and/or e-mail list may store a historical and/or chronological list of web site links and/or sent/received e-mail messages. As described above, because some mobile devices do not permit applications to access one or more portions of the operating system and/or hardware that may reveal a phone number that corresponds to the mobile device 208, the example application 222 of FIG. 2 makes one or more alternate attempts to identify a phone number associated with the mobile device 208. While some mobile device operating systems include an Application Programming Interface (API), such APIs may reveal a limited set of function calls for an application that do not permit complete access to mobile device hardware and/or other information related to the mobile device. For example, the Symbian® mobile phone operating system does not permit third party applications to acquire the phone number of the mobile device.

In some examples, the API or other manner of access reveals an International Mobile Equipment Identifier (IMEI) number, which is unique to each phone. However, IMEI numbers are not readily identified by and/or familiar to many candidate panelists. Thus, it is burdensome to request the IMEI number(s) from such candidate panelist(s) at the web site when soliciting other registration, demographic and/or personal information. Even if the IMEI and/or ESN were readily available to the candidate panelist, such identifiers are lengthy and prone to entry error. Additionally, in the event that a panelist obtains a different mobile device at a later date, a telephone number of that panelist is likely to follow them on the subsequent (e.g., new) mobile device, but the IMEI number will not. Thus, it is advantageous to match the telephone number of the panelist to the panelist in the records of the monitoring entity (e.g., the entity supplying the ODM and/or collecting the monitoring data).

In response to the example application 222 identifying the telephone number of the mobile device 208 (e.g., by parsing the SMS message log, by parsing the browser history log, etc.), the example mobile message generator 228 generates an initialization message to be transmitted to the example ODM server 202. As used herein, the initialization message may include an initialization SMS message, an e-mail, an HTTP request, and/or an initialization URI. For example, in response to the mobile message generator 228 sending an initialization message (e.g., an SMS text message), if the ODM application 222 does not receive acknowledgment from the ODM server manager 212 within a threshold period of time, then the initialization message is deemed lost and/or otherwise unsuccessful. As such, the example mobile URI generator 230 may make one or more additional attempts to send an initialization message (e.g., by sending a URI via e-mail or HTTP, which provides an indication of transmission success). The initialization message may include a text message to the ODM server 202, which includes the unique panelist identifier and/or the identified telephone number of the mobile device 208 as part of the text. However, even if the example mobile message generator 228 did not include a text message tailored to include the identified telephone number, the example ODM server 202 could, upon receiving the initialization SMS message from the mobile device 208, identify the mobile telephone number via, for example, caller ID information resolved by the wireless infrastructure 206 based on the IME number of the sending mobile device 208. As described above, even if the application does not have privileged access to or if the mobile device 208 itself does not contain, cannot access, and/or does not otherwise know its own mobile telephone number, the wireless infrastructure may use the IMEI number or other identifier to determine a corresponding wireless telephone number that is associated with the mobile device 208. In some examples, the wireless infrastructure may employ a lookup table to reconcile IMEI numbers with corresponding mobile telephone numbers. When such initialization SMS messages reach the ODM server 202, they may be accompanied by the wireless telephone number of the sending mobile device 208.

In operation, upon receipt of the initialization message, the received telephone number information and the received unique panelist identifier are compared with the telephone number entered by the candidate panelist via the registration server 210 and the unique panelist identifier generated by the ID generator 214. As described above, the example ID generator 214 generates the unique panelist identifier after the candidate panelist enters and/or otherwise provides adequate demographics information and agrees to the membership and/or privacy agreement(s). If the corresponding information matches, then the sender of the initialization message is deemed to be authorized to use the ODM application 222. Additionally, matching information serves as confirmation that the sender/user is the same user that agreed to the privacy, terms of service and/or membership agreement(s).

However, in other circumstances, an individual that has not provided personal and/or demographics information may obtain access to the ODM application and/or the ODM SMS invitation. Such unauthorized access may occur when an authorized user (i.e., a candidate panelist that has provided personal and/or demographic information and agreed to the membership, terms of service and/or privacy agreement(s)) shares their SMS message and/or e-mail invitation with someone else. In such circumstances, the ODM application is not authorized to execute on the mobile device 208 of the unauthorized individual, as described in further detail below. On the other hand, the unauthorized user may be provided with an invitation to access an on-line website (e.g., via the registration server 210) in response to a failed match.

For circumstances in which transmission and/or reception of SMS messages is not reliable and/or deemed trustworthy, the example mobile URI generator 230 may generate an initialization HTTP request addressed to an initialization URI. The initialization request may include embedded information indicative of the identified telephone number of the mobile device 208 and/or the unique panelist identifier associated with the panelist. Rather than sending an initialization message via an SMS message, the example mobile message generator 228 may navigate to the address provided by the example mobile URI generator 230 using a hypertext transfer protocol (HTTP). At least one benefit of employing HTTP (or a secure version (HTTPS)) rather than sending an initialization message via an SMS message is that HTTP includes handshaking. In other words, when an SMS message is transmitted, no feedback occurs to indicate success of the sender. However, HTTP requests invoke a corresponding response that may include information related to completion.

In response to receipt of the initialization message, either via the initialization SMS message or e-mail or an HTTP request, the example ODM server manager 212 determines whether the received telephone number matches the correct unique panelist identifier, both of which were transmitted in the initialization message. If a candidate panelist enters an incorrect phone number via the registration server 210, or if the candidate panelist shares the installation message with someone else (e.g., a third party), then the user attempting to use the installed application 222 is not authorized to do so and/or has not agreed to the privacy, terms of service and/or membership agreement(s). For example, if the candidate panelist provides demographic information and the phone mobile number 414-542-6609 in an effort to qualify as a panelist (e.g., in response to one or more participation incentives), the example ID generator 214 generates a unique panelist identifier to associate with the provided mobile phone number (i.e., 414-542-6609) resulting in a matched candidate identification pair.

The first matched candidate identification pair is stored by the ODM server 202 for later comparison. After the mobile device 208 receives the installation message (including the first matched candidate identification pair) from the ODM server 202, the mobile device 208 extracts the identification pair from the installation message and stores the telephone number in a memory of the mobile device 208. During data collection, the ODM application 222 associates the collected data with the extracted phone number before sending the collected data back to the ODM server. To provide the ODM server 202 with an indication that the installation message was successfully received, the ODM application 222 forwards the extracted identification pair back to the ODM server 202.

In many cases, the extracted telephone number correctly identifies the mobile device that is associated with the candidate panelist that previously provided the demographic information (e.g., via a webpage facilitated by the example registration server 210) and corresponds to the same candidate panelist that agreed to the terms of service, membership agreement and/or privacy agreement(s). On the other hand, in the event that the candidate panelist forwarded their installation message (e.g., installation SMS message, installation e-mail message, etc.) to an alternate user (e.g., a friend, a family member, etc.), then the ODM application should not be allowed to operate on the mobile device associated with the alternate user. For example, if the candidate panelist shares the installation message with the alternate user, then the alternate user also receives the embedded telephone number and unique panelist identifier associated with the candidate panelist. To verify that the telephone number in the installation message matches the mobile device, the ODM application sends the extracted telephone number and unique panelist identifier to the ODM server 202 via the wireless infrastructure 206. The ODM server 202 compares the received telephone number from the installation message with the telephone number derived from caller ID information provided by the wireless infrastructure 206. If the telephone numbers match, then the candidate panelist is deemed to be correctly associated with the mobile device 208 and has successfully installed the ODM application 222. An activation message is then forwarded from the ODM server 202 to the telephone number associated with the candidate panelist to, for example, unlock the ODM application 222 and/or permit full functionality of the ODM application 222. However, if the telephone numbers do not match, then the ODM server 202 identifies an indication of candidate panelist mismatch, which may be due to data entry error(s) or sharing of the installation message. In such circumstances, the ODM server 202 does not send an activation message, but rather, sends an SMS message to the telephone number associated with the caller ID information, which includes an invitation to the user to visit an ODM registration website (e.g., via the registration server 210) and participate in market research.

In some circumstances, the example ODM server 202 may not need to rely upon caller ID information provided by the example wireless infrastructure 206 to verify that the telephone number in the installation message matches the mobile device. Consider an example where the alternate user receives the installation message from the candidate user, the alternate user downloads the ODM application 222, which parses the installation message to extract the telephone number embedded therein. Furthermore, after the example ODM application 222 parses the installation message and extracts the telephone number embedded therein, the ODM application 222 sends the extracted telephone number to the ODM server 202 to confirm that the installation has occurred. Instead of employing caller ID information associated with the sender of the extracted telephone number that is received from the wireless infrastructure 206, the ODM server 202 transmits an authorization message to the extracted telephone number. If the original installation message was shared by the candidate panelist with an alternate user, then the authorization message sent by the ODM server 202 is received by a different wireless device (i.e., the wireless device associated with the proper candidate panelist), which does not have the ODM application 222 installed thereon. As a result, the authorization message sent by the ODM server 202 will not be acknowledged. In some examples, if the acknowledgement message is not received within a threshold period of time, the ODM server 202 will consider the candidate panelist as invalid and/or contact the candidate panelist via e-mail to communicate the failure. The failure e-mail may also include instructions to assist the candidate panelist with ODM application set-up and/or data entry checking.

Figure 3:
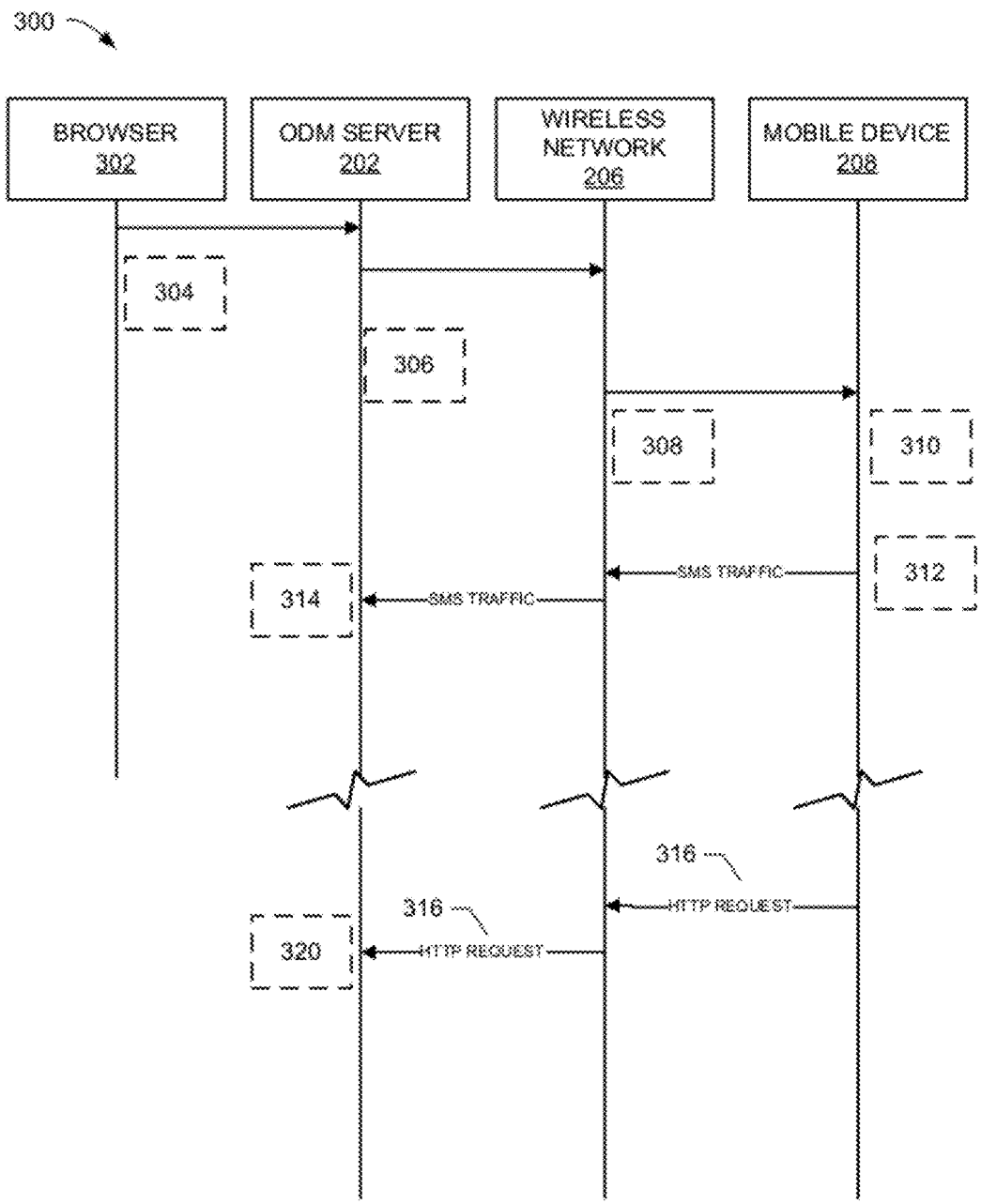
FIGS. 3 and 4 are message diagrams representative of example communications between elements of the example system shown in FIG. 2.

FIG. 3 illustrates an example message diagram 300 illustrating example communications involving a browser 302, the ODM server 202, the wireless network 206 and/or the mobile device 208. In operation, the browser 302 communicatively connects to the ODM server 202 via one or more web pages hosted by the example registration server 210. Via the browser 302, which is separate from the mobile device 208 and which may be implemented on, for example, a PC with a full size keyboard and/or display, the candidate panelist provides demographic and/or personal information 304 to the ODM server 202. In the illustrated example, the personal information provided by the candidate panelist includes the phone number of their mobile device 208. The ODM server 202 of the illustrated example invokes the server SMS generator 218 to generate and send an installation SMS message (306), using the provided telephone number, to the wireless network 206. As described above, because the mobile device 208 may not know and/or may not have access to its own phone number, communication services for the mobile device 208 operated via the example wireless network 206 translate the telephone number into a suitable identifier (e.g., an IMEI number) that causes delivery of the installation SMS message to the mobile device 208 and forwards (308) the SMS message.

After subsequent installation of the example application 222 on the mobile device 208, the application 222 determines whether to transmit the initialization message as an initialization SMS, an initialization e-mail, or an initialization HTTP request. In some examples, the application 222 reviews an SMS log of the mobile device 208 for the received installation SMS message, extracts the phone number included with the installation SMS message (312), and sends back an initialization SMS message to the wireless network 206 having the extracted telephone number embedded therein. The initialization SMS message (312) is forwarded from the wireless network 206 to the ODM server 202. The ODM server 202 confirms registration of the panelist and corresponding mobile device 208 (314).

As described above, the example ODM server 202 and/or example application 222 operating on the mobile device 208 may employ HTTP (or HTTPS) rather than register the panelist and mobile device 208 via SMS messages. While the illustrated example of FIG. 3 illustrates that the installation message occurs via an installation SMS message, the ODM server 202 may, without limitation, send the installation message via HTTP and/or an e-mail message having the installation URI embedded therein. In other examples (illustrated by the break in FIG. 3), the application 222 reviews the SMS log of the mobile device 208 for the received installation SMS message, extracts the phone number included with (embedded in) the installation SMS message, and generates an initialization HTTP request (316). The initialization request is forwarded to the example wireless network 206, which routes the request 316 to the ODM server 202 to complete registration (320).

Figure 4:
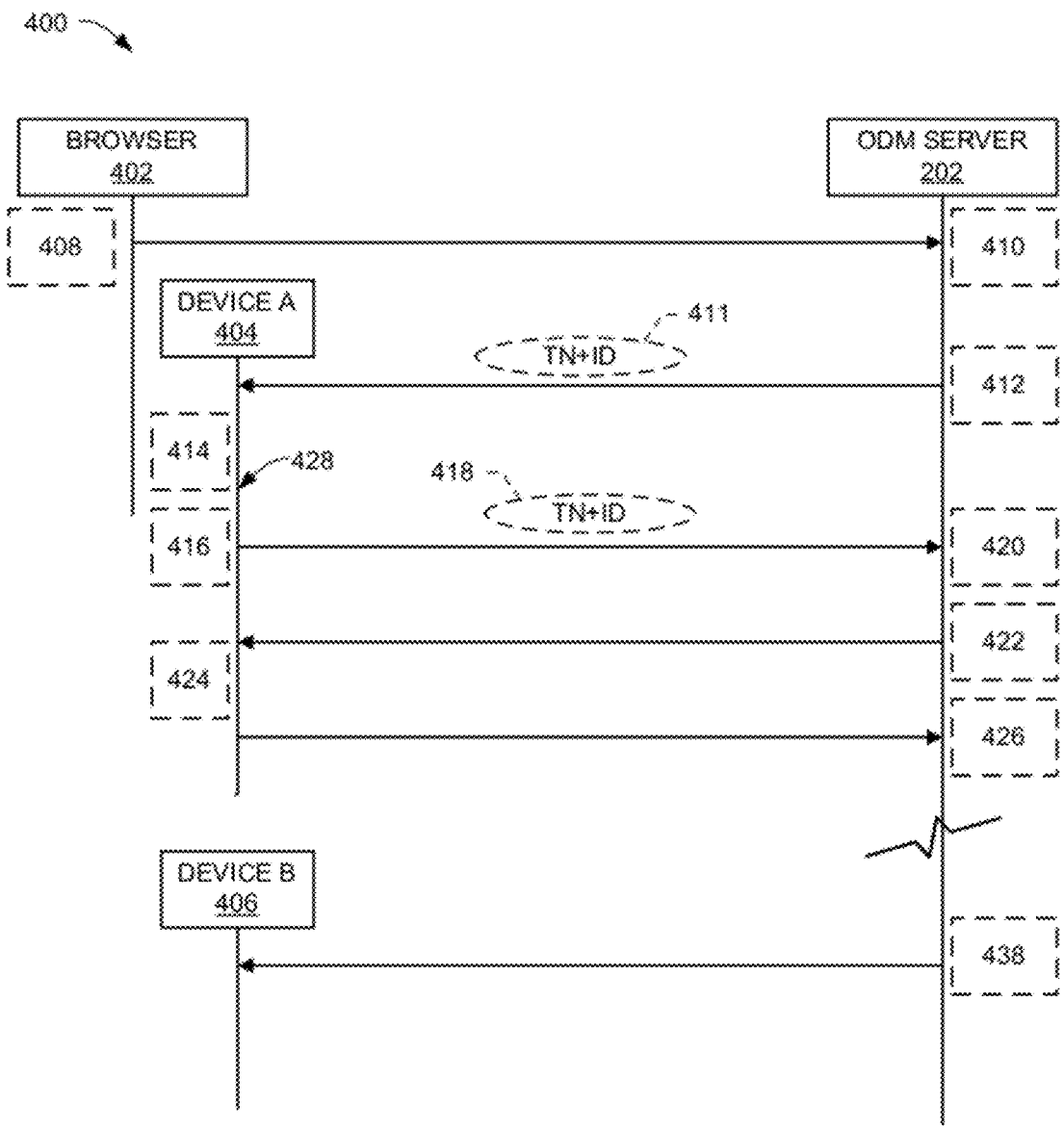

FIG. 4 illustrates a message diagram 400 showing communication between a browser 402, a wireless device associated with a candidate panelist device ("Device A") 404, a wireless device associated with an alternate user device ("Device B") 406, and the ODM server 102. The message diagram 400 of FIG. 4 illustrates an example circumstance in which the candidate panelist successfully associates their wireless device with their profile information and installs the ODM application. The example message diagram 400 of FIG. 4 also includes an example circumstance in which the candidate panelist shares their installation message with the alternate user, and how example methods and apparatus disclosed herein prevent the unauthorized alternate user from using the ODM application.

In operation, the candidate panelist provides information to the ODM server 202 via, for example, the registration server 210 (408). The provided information may include demographic information and a telephone number associated with Device A 404. After providing a sufficient amount of information and a corresponding wireless device telephone number, the ID generator 214 of the ODM server 202 generates a unique panelist identifier for the candidate panelist (410). The candidate panelist will be promoted to a confirmed panelist if sufficient demographic information is provided and the ODM application is successfully installed and associated with Device A 404.

The example ODM server 202 of FIG. 4 sends an installation message (e.g., an SMS message, an e-mail message containing a custom URI, etc.) embedded with the telephone number provided by the candidate panelist and the unique panelist identifier (412). The combined telephone number and unique panelist identifier sent by the ODM server 202 are referred to herein as a first ID pair 411. Upon receipt of the installation message, an affirmative indication from the candidate panelist causes the ODM application to be downloaded and installed (414). After installation, the ODM application parses the received installation message, which may have been stored by Device A 404 in an SMS message log or an e-mail message (416). The installation message parsing extracts the telephone number and unique panelist identifier embedded within the installation message, and the ODM application causes the extracted information to be stored on a memory of Device A 404 (416). The extracted information is further sent back to the ODM server 202 as a second ID pair 418.

The example ODM server 202 compares the first ID pair 411 with the second ID pair 418 to confirm whether they are the same or different (420). If the first and second ID pair 411, 418 are the same, then the example ODM server 202 sends an authorization message using the extracted telephone number (422). When Device A 404 receives the authorization message, the ODM application becomes fully enabled to operate as an on device meter and send collected data back to the ODM server 202. To allow the ODM server 202 to learn that the ODM application has been successfully enabled to operate as an on device meter, the ODM application sends an acknowledgement message to the ODM server (424). Upon receipt of the acknowledgement message, the example ODM server 202 promotes the candidate panelist to a confirmed panelist (426).

On the other hand, the lower portion of FIG. 4 shows an alternative example where the candidate panelist provided the installation message to one or more alternate user(s) (e.g., interested friends, family members, etc.). In such circumstances, apparatus, methods and/or articles of manufacture disclosed herein identify that such alternate user(s) are not authorized to use the ODM application on their device(s). For example, if the installation message is shared after it is sent to Device A 404 (see point 428), then the messages of example FIG. 4 operate as described above until the ODM server 202 sends the authorization message using the extracted telephone number (422). In that case, Device B 406, which has a telephone number different than the telephone number embedded in the installation message, never receives the authorization message (422). Instead, Device A 404, which responds to the telephone number extracted from the installation message, receives an SMS message or e-mail message with the authorization message. However, because Device A 404 does not have the ODM application installed, Device A 404 does not process the authorization message and the ODM server 202 identifies a timeout period in which no acknowledgement message is received (438). The candidate panelist may be notified of the failure via an e-mail message from the ODM server 202. Additionally, the example ODM server 202 may identify the installation message as being compromised.

On the other hand, although the alternate user associated with Device B 406 is not a candidate panelist and has, thus, not provided demographic information and a telephone number associated with Device B 406, the attempt to install and/or use the ODM application suggests a willingness to participate as a panelist. The methods, apparatus and/or articles of manufacture disclosed herein take advantage of the opportunity to obtain another panelist by, in part, sending the alternate user an invitation to become a candidate user. In response to a failure to receive an acknowledgement from an authorization message, the ODM server 202 obtains caller ID information associated with receipt of the initialization message (416). If available caller ID information illustrates a telephone number different from the extracted telephone number in the initialization message, then the ODM server 202 forwards an invitation message to the different number. The invitation may, for example, direct the recipient to the website facilitated by the example registration server 210, thereby allowing the alternate user to provide sufficient demographics information and a telephone number associated with their wireless device to be used in on device metering market activity.

While an example manner of implementing the system 200 to facilitate registering a mobile device has been illustrated in FIG. 2, one or more of the elements, processes and/or devices illustrated in FIG. 2 may be combined, divided, re-arranged, omitted, eliminated and/or implemented in any other way. Further, the example ODM server 202, the example registration server 210, the example server-side manager 212, the example ID generator 214, the example server URI generator 216, the example server SMS generator 218, the example e-mail generator 220, the example application 222, the example installation message parser 224, the example browser manager 226, the example mobile message generator 228 and/or the example mobile URI generator 230 of FIG. 2 may be implemented by hardware, software, firmware and/or any combination of hardware, software and/or firmware. Thus, for example, any of the example ODM server 202, the example registration server 210, the example server-side manager 212, the example ID generator 214, the example server URI generator 216, the example server SMS generator 218, the example e-mail generator 220, the example installation message parser 224, the example browser manager 226, the example mobile message generator 228 and/or the example mobile URI generator 230 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of the patent are read to cover a purely software and/or firmware implementation, at least one of the example, ODM server 202, the example registration server 210, the example server-side manager 212, the example ID generator 214, the example server URI generator 216, the example server SMS generator 218, the example e-mail generator 220, the example application 222, the example installation message parser 224, the example browser manager 226, the example mobile message generator 228 and/or the example mobile URI generator 230 of FIG. 2 are hereby expressly defined to include a tangible computer readable medium such as a memory, DVD, CD, etc. storing the software and/or firmware. Further still, the example system 200 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the system 200 of FIG. 2 and/or the example message diagrams of FIGS. 3 and 4 are shown in FIGS. 5-8. In these examples, the machine readable instructions comprise a program for execution by a processor such as the processor P105 shown in the example computer P100 discussed below in connection with FIG. 9. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 5-8, many other methods of implementing the example system 200 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 5:
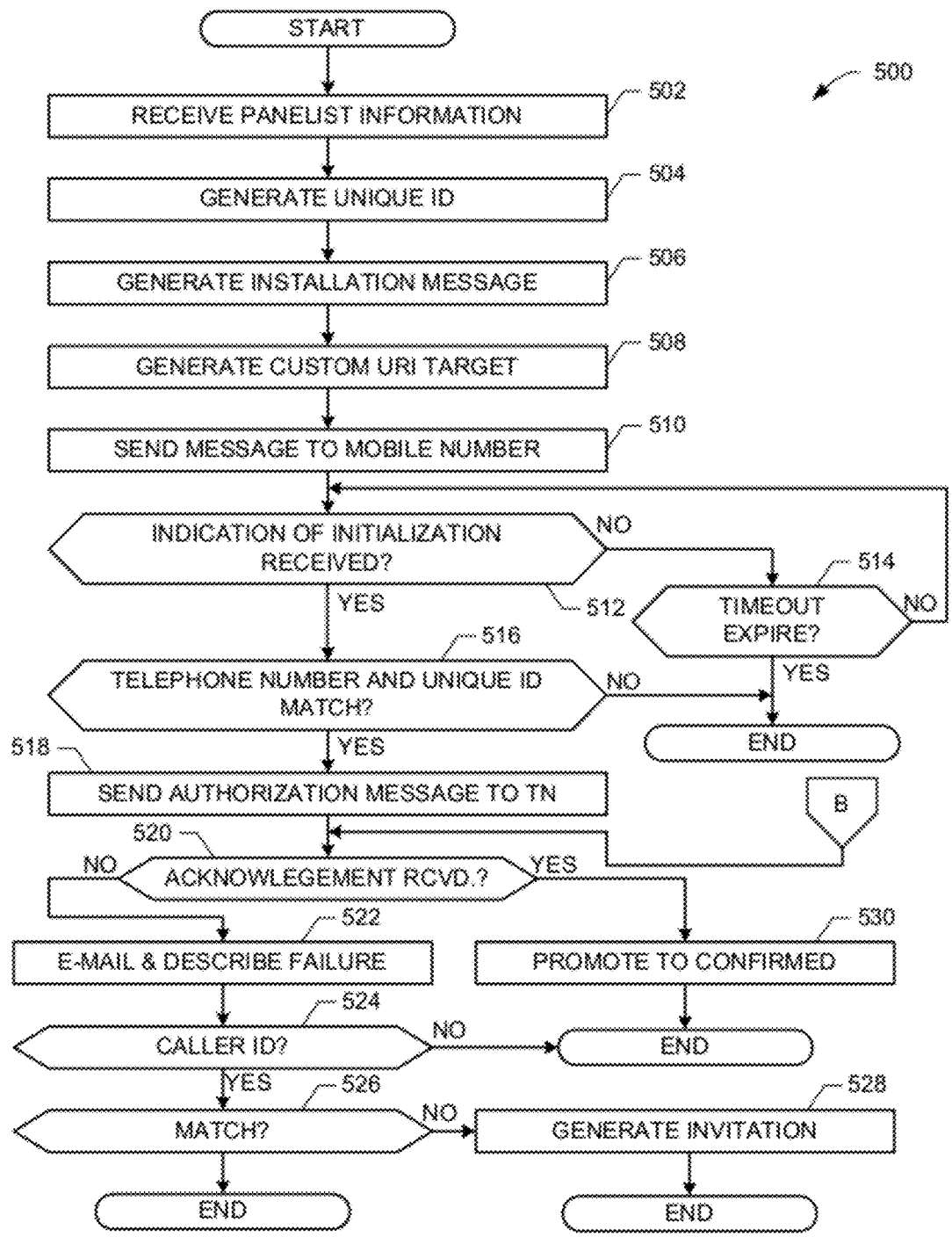
FIGS. 5-8 are flowcharts representative of example machine readable instructions that may be executed by the example system shown in FIG. 2.

The program 500 of FIG. 5 begins at block 502 where the example registration server 210 of the ODM server 202 receives demographics and/or personal information from candidate panelists. Demographics information may include, but is not limited to race, national origin, household address, household income, personal income, age, gender, marital status and/or number of children. Additionally, personal information may include a name, preferred sports, hobbies, number and/or type(s) of computers, preferred media genres, wireless device telephone number, etc. The example registration server 210 may facilitate one or more web pages having forms that allow the candidate panelist to enter personal and/or demographic information. After the candidate panelist completes entering the personal and/or demographic information, the example ID generator 214 generates a unique identification number (e.g., a numeric or alpha-numeric value) to associate with the candidate panelist (block 504). As described in further detail below, the example server-side registration manager may look for a return of the unique identification number and the telephone number of the mobile device 208 to confirm registration was successful.

The example server-side registration manager 212 invokes the server SMS generator 218 or the server URI generator 216 to generate an installation message (block 506). As described above, example methods, apparatus, systems and/or articles of manufacture described herein may employ SMS messaging techniques, e-mail techniques and/or HTTP techniques and/or any other communication protocols when communicating between the ODM server 202 and the mobile device 208. When the installation message is generated (block 506), the example SMS generator 218 or the example server URI generator 216 include the mobile telephone number provided by the candidate panelist, the unique identification number generated by the example ID generator 214, and a URI to allow the candidate panelist to download and install the example application 222. The URI may be further tailored as a custom URI having the application download source location, the unique identification number and the telephone number embedded therein as a string (block 508). For example, the example server URI generator 216 may generate the following example string: http://odm.companyxyz.com/enroll/GetApp?pn=4142825176&id=98787253, in which the embedded phone number is preceded by "pn=" and the embedded identification number is preceded by "id=."

The installation message is sent by the example ODM server 202 as an SMS message using the telephone number, and/or as an e-mail message using an e-mail address (block 510). The example ODM server 202 monitors for an indication that the candidate panelist has installed the example application 222 on the mobile device 208 (block 512) and if not, the ODM server 202 determines whether a timeout period has expired (block 514). A timeout period may be set for any amount, such as a number of minutes, hours, days, weeks or months. In some examples, the installation message sent by the example ODM server 202 includes an indication of how long the candidate panelist may wait before the invitation to register expires. For example, the ODM server 202 may include the language "Please click on this link to install the metering application within one week. http://odm.companyxyz.com/enroll/GetApp?pn=4142825176&id=98787253" If the example timeout period has not expired (block 514), control returns to block 512 to continue to wait, otherwise the example ODM server 202 deems that the candidate panelist is not willing to participate and further attempts end.

On the other hand, if an indication of initialization is received (block 512), the example server-side registration manager 212 determines whether the indication of initialization includes the telephone number and the unique identification number associated with the candidate panelist (block 516). If not, then the attempt to register the candidate panelist and their corresponding mobile device 208 was not successful and the process 500 ends. However, if a match occurs, then an authorization message is sent to the telephone number from the initialization message to fully enable the ODM application to function as an on device meter (block 518). The ODM server manager 212 waits for an acknowledgement message from the mobile device 208 (block 520).

In the event that the ODM server manager 212 does not receive the acknowledgement message (e.g., after a threshold period of time) (block 520), then the ODM server manager 212 considers the candidate panelist profile information (e.g., demographic information) invalid and sends an e-mail message to the candidate panelist regarding the failure to associate their mobile device with the ODM server 202 (block 522). The e-mail message may allow, for example, the candidate panelist to re-attempt efforts to participate as an on device metering panelist in case the failure was not due to a lack of interest. However, in the event that the failure is caused by an alternate user attempting to use the ODM application without having first provided sufficient demographics information, then the example ODM server manager 212 determines whether caller ID information is available (block 524). If not, the example program 500 ends, otherwise the ODM server manager 212 determines whether the caller ID information and the telephone number from the initialization message match (block 526). If so, then the example program 500 ends, otherwise an invitation to participate in on device metering is sent to the telephone number associated with the caller ID information (block 528).

Figure 6:
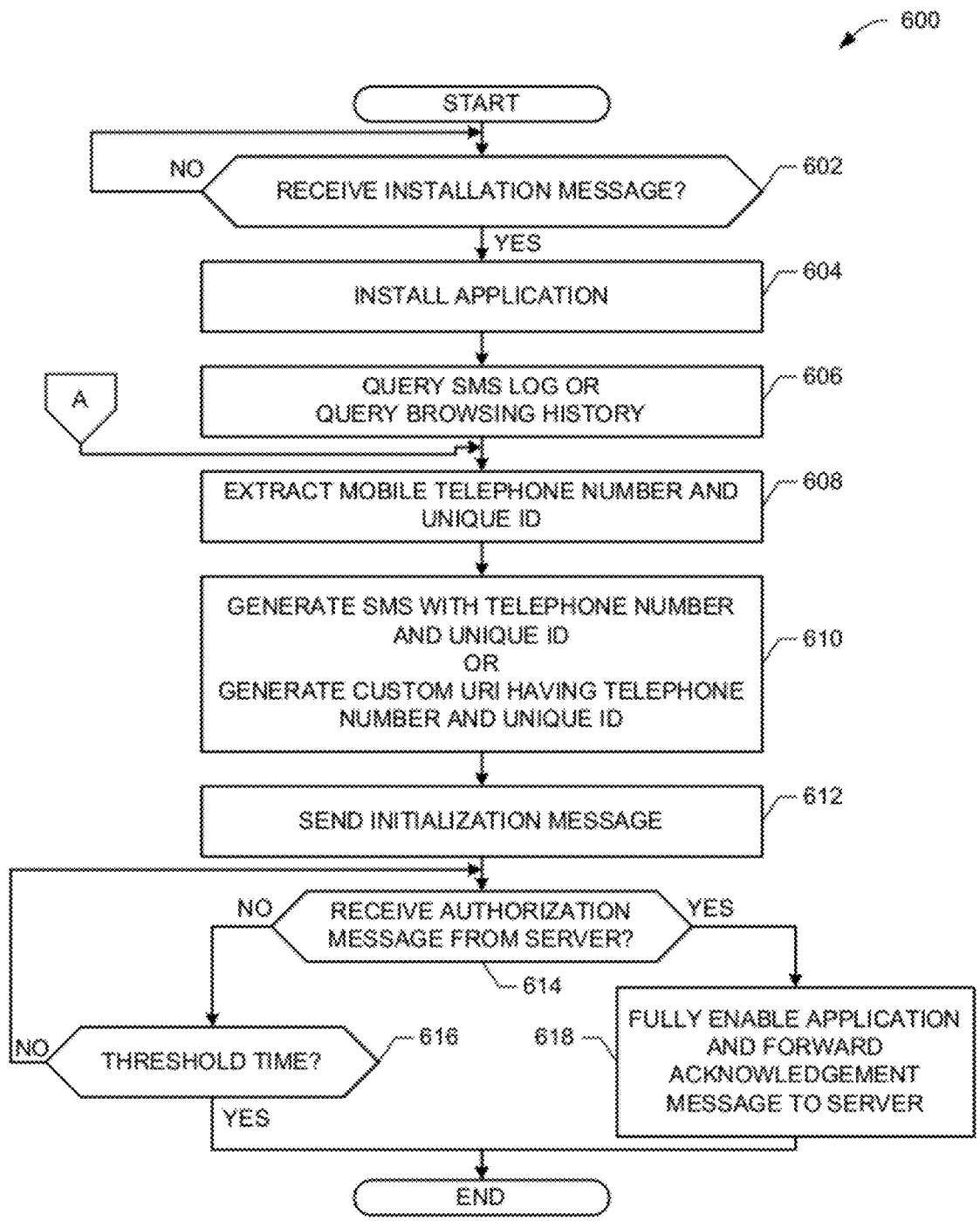

The program 600 of FIG. 6 begins at block 602 where the example mobile device 208 monitors for receipt of the installation message. If it is not received, then the example program 600 continues to wait, otherwise the example mobile device 208 installs the example application 222 (block 604) after the installation message is received and the candidate panelist clicks on a corresponding URI embedded within the installation message. As described above, the installation message may be received by the example mobile device 208 as an SMS message or as an e-mail message. In either case, the received installation message includes the telephone number of the mobile device 208 and a unique identification number associated with the candidate panelist and the mobile device 208, both of which were sent by the example ODM server 202.

The example application 222 invokes the example installation message parser 224 to parse-out the telephone number and unique identification number embedded within the received installation message (block 606). In some examples, the installation message parser 224 obtains the received installation message from an SMS log of the mobile device 208 and parses the received SMS messages for the telephone number and unique identification number (block 608). In other examples, the installation message parser 224 invokes the browser manager 226 to search a browsing history of the mobile device 208, which reveals the custom URI that was embedded within the installation message. For example, if the user received the custom URI via an SMS message or an e-mail message, the candidate panelist act of clicking on the URI causes a browser of the mobile device 208 to navigate to the download location for the application 222. Accordingly, the example installation message parser 224 may parse the custom URI in the browsing history for characters indicative of a phone number (e.g., "pn=") and/or characters indicative of a unique identification number (e.g., "id=").

While the operating system and/or API of the mobile device 208 may not permit access to the phone number of the mobile device 208, because the application 222 extracts such information from the received installation message the application 222 has the ability to store the telephone number in a memory. Typically, the operating system and/or API of the mobile device 208 provides access to some memory, which can be accessed when the application 222 operates on the mobile device 208. Accordingly, because the application 222 now has the phone number of the mobile device 208 in an accessible memory, subsequent metering data collected by the example application can be sent to the ODM server in connection with the telephone number to identify the mobile device and its corresponding panelist.

To provide the example ODM server 202 with an indication that the application 222 is successfully installed and operating, the example mobile message generator 228 invokes the mobile URI generator 230 to generate a custom SMS or a custom URI directed to the ODM server 202 (block 610). In the event that the indication occurs via SMS messaging, the example mobile message generator 228 generates an SMS message directed to a phone number associated with the ODM server 202 and generates text having the phone number of the mobile device 208 and the unique identification number. In the event that the indication occurs via HTTP, the example mobile message generator 228 invokes the mobile URI generator 230 to generate a custom URI directed to an HTTP address of the ODM server 202, and embeds the phone number of the mobile device 208 and the unique identification number therein. Regardless of whether the indication occurs via SMS messaging or HTTP, the example application 222 sends the indication to the ODM server 202 to associate the mobile device 208 with the candidate panelist (the initialization message) (block 612).

The ODM application 222 has limited functionality after it is initially installed on the example mobile device 208. For example, the ODM application 222 may be initially limited to functions associated with identifying the telephone number of the mobile device 208, but functions associated with on device metering activities (e.g., audio recording, GPS data sampling, device activity recording, etc.) may be disabled until the candidate panelist is confirmed to have correctly installed the ODM application 222 on the correct mobile device 208. To that end, the example ODM application 222 monitors for an authorization message from the ODM server 202 in response to sending the initialization message (block 614). If a threshold time to wait for the authorization message has not expired (block 616), then control returns to block 614, otherwise the example program 600 ends. A failure to receive the authorization message may be due to, for example, a lack of interest in the candidate panelist to participate, or a circumstance in which the installation message of the candidate panelist was shared and/or otherwise provided to an alternate user that has not provided sufficient demographics information and/or agreed to the terms of service agreement(s). On the other hand, if the example ODM application 222 receives the authorization message from the ODM server 202 before the threshold expires (block 614), then the ODM application 222 fully enables itself to perform on device metering (e.g., by permitting full access to on-board sensors of the mobile device such as, but not limited to, microphones, global positioning satellite sensors, compass sensors, accelerometers, etc.) and forwards an acknowledgement message to the ODM server 202 (block 618). In other words, the ODM application 222 is conditionally enabled in response to receiving the authorization message.

In still further circumstances, a user will download the ODM application 222 from a hosted application repository (e.g., Android Market, Apple AppStore, iTunes, etc.), a website and/or other location. Some users that install the ODM application 222 may be existing users, such as confirmed panelists that have a new mobile device, confirmed panelists that have a replacement mobile device after losing a previous mobile device and/or confirmed panelists that have intentionally or inadvertently uninstalled a fully enabled ODM application 222. Other users that install the ODM application 222 may be new users that are interested in participating in on device metering activities (e.g., in response to promotions, incentives, curiosity, etc.). The example methods, apparatus and/or articles of manufacture disclosed herein identify circumstances of returning confirmed panelists and new users (e.g., candidate panelists) that have installed the example ODM application 222.

Figure 7:
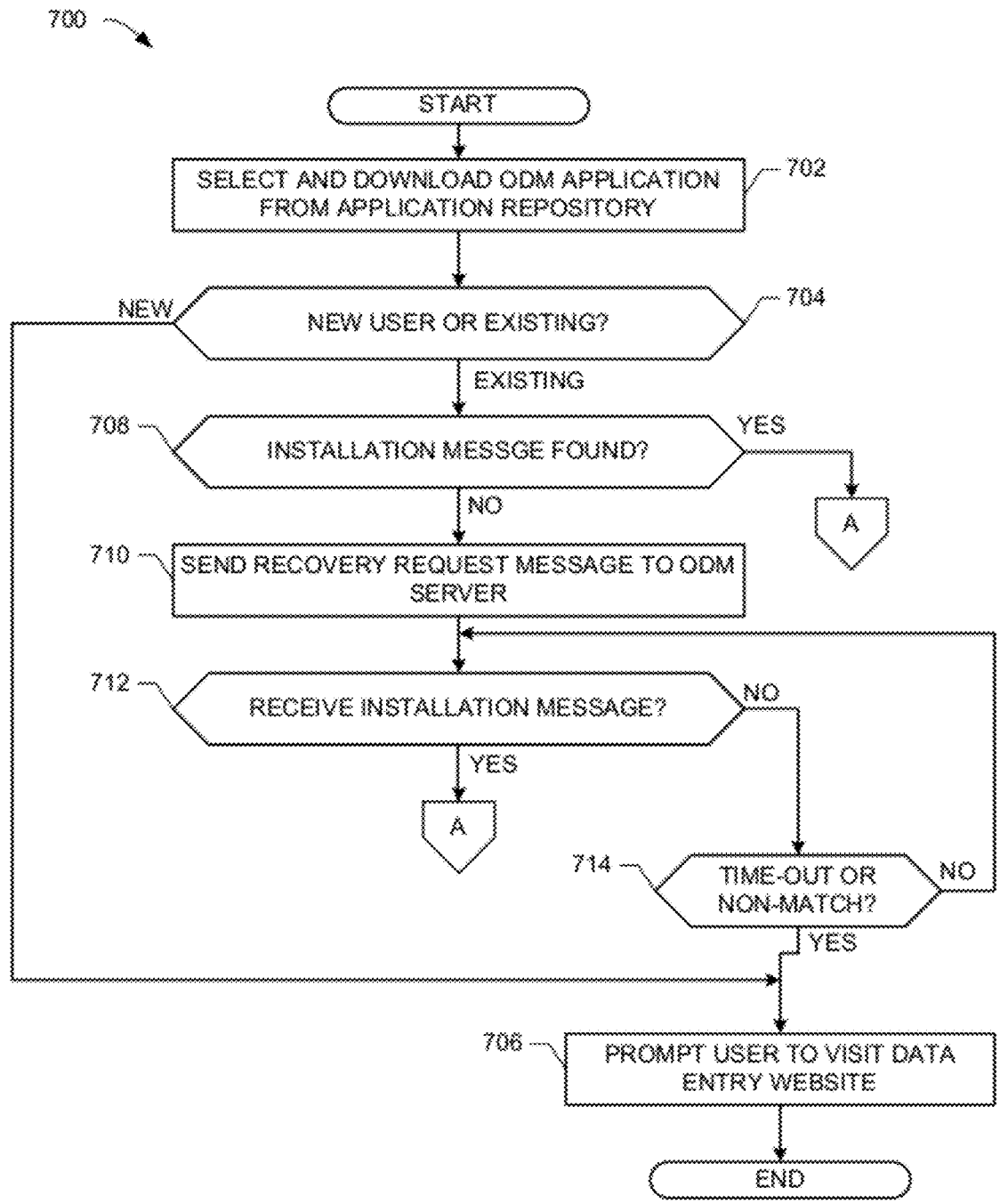

The program 700 of FIG. 7 begins at block 702 where the example ODM application 222 is selected (e.g., from the Android Market), downloaded to the mobile device 208, and installed. As described above, the example ODM application 222 is initially installed with limited (e.g., partial) functionality until it can be confirmed that the candidate panelist has provided sufficient demographic information, agreed to the membership agreement, the terms of service agreement and/or the privacy agreement, and the correct mobile device 208 associated with the candidate panelist is confirmed. Partial functionality may include, but is not limited to disabled access to one or more sensors of the example mobile device 208. Sensors may include, but are not limited to global positioning satellite sensors, microphones, light sensors, compass and/or magnetic sensors, and/or accelerometers. The example ODM application 222 prompts the new user to confirm whether they are a new user or an existing user (block 704), such as by way of a button press and/or user interface input on a touch sensitive display of the example mobile device 208. If the user indicates (e.g., via user interface selection) that they are a new user, then the example ODM application 222 prompts the new user to visit the data entry website (e.g., a website hosted by the example registration server 210) to begin association of user demographics information with the ODM application 222 and associated mobile device 208 (block 706).

If the user indicates that they are an existing user (block 704), then the example ODM application 222 searches for a previously received installation message (block 708). If the previously received installation message is found (block 708), control advances to block 608 of FIG. 6. However, if a substantial amount of time has elapsed, a previously received installation message was erased (e.g., an SMS message log was cleared) or if an installation message was not previously received by the example mobile device 208, then the example ODM application 222 sends a recovery request message to the example ODM server 202 (block 710). The example ODM application 222 determines whether a corresponding installation message is received (block 712) and, if not, determines whether a time-out period (e.g., a threshold duration of time to wait for the installation message) has occurred and/or whether the ODM server 202 returns an indication of no matching user profile (block 714). In the event of a time-out and/or indication of no user match (block 714), the ODM application 222 prompts the new user to visit the data entry website (e.g., a website hosted by the example registration server 210) to begin association of user demographics information with the ODM application 222 and associated mobile device 208 (block 706). On the other hand, if the example ODM application 222 receives the installation message from the ODM server 202 (block 712), then control advances to block 608 of FIG. 6.

Figure 8:
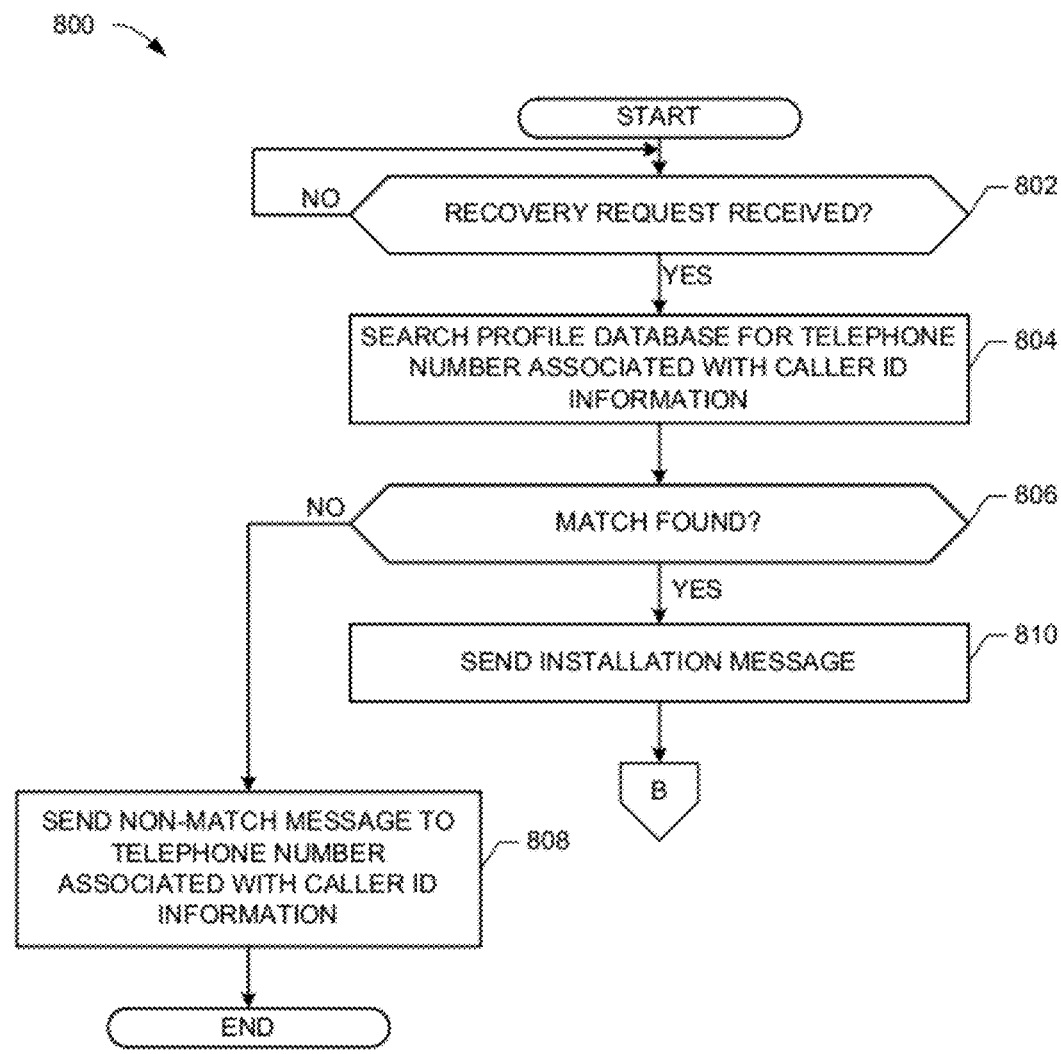

The program 800 of FIG. 8 begins at block 802 where the example ODM server 202 monitors for an indication of the recovery request message. Upon receiving an indication of the recovery request message (block 802), the example ODM server 202 searches the profile database 221 for a telephone number associated with caller ID information received with the recovery request message (block 804). For example, in the event that the user installing the ODM application 222 was previously a confirmed panelist, then their profile information (e.g., demographic information, phone number associated with their mobile device 208, etc.) will be stored in the profile database 221 of the ODM server 202. In the event a match is not found (block 806), then an message indicative of a non-match is forwarded to the telephone number associated with caller ID information (block 808), which causes the ODM application 222 to prompt the user to visit a data entry website for candidate panelist data entry. On the other hand, in the event a match is found (block 806), then the ODM server 202 sends an installation message to the telephone number associated with the received caller ID information (block 810), and control advances to block 520 of FIG. 5.

Figure 9:
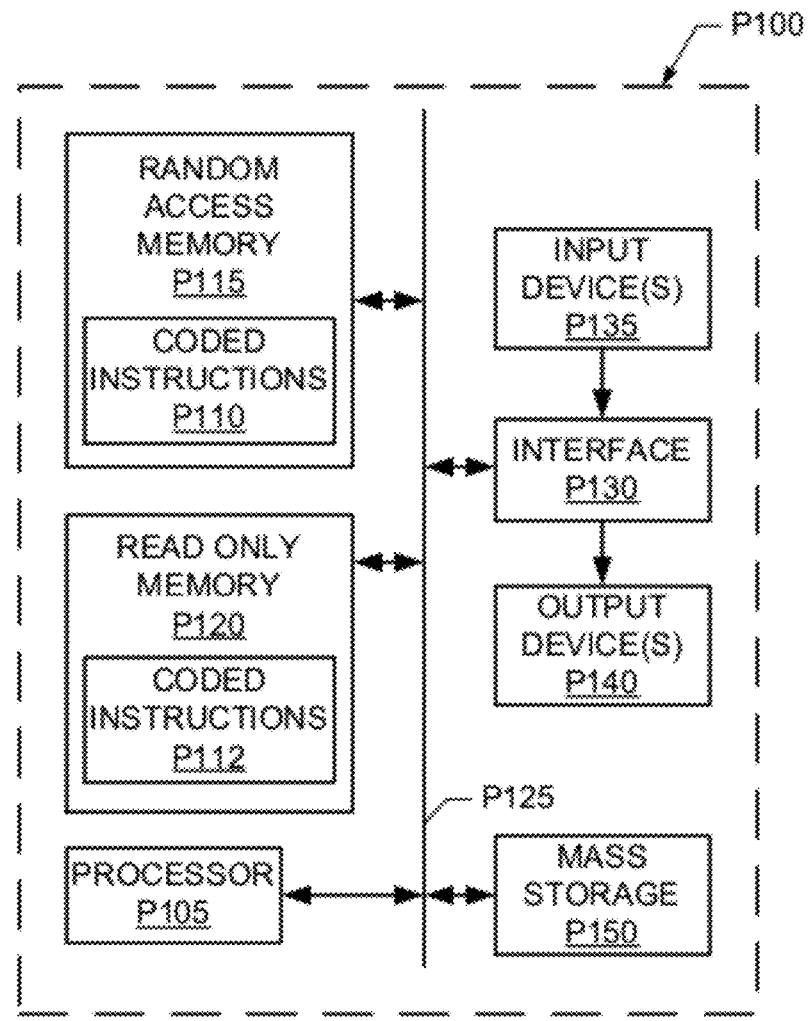
FIG. 9 is a schematic illustration of an example processor platform that may execute the instructions of FIGS. 5-8 to implement any or all of the example methods, systems, and/or apparatus described herein.

FIG. 9 is a block diagram of an example computer P100 capable of executing the instructions of FIGS. 5-8 to implement the apparatus of FIG. 2 and/or the example message diagrams of FIGS. 3 and 4. The computer P100 can be, for example, a server, a personal computer, a mobile phone (e.g., a cell phone). a personal digital assistant (PDA), an Internet appliance, or any other type of computing device.

The system P100 of the instant example includes a processor P105. For example, the processor P105 can be implemented by one or more Intel® microprocessors. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P115, P120 is typically controlled by a memory controller.

The computer P100 also includes an interface circuit P130. The interface circuit P130 may be implemented by any type of interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, and/or a cathode ray tube display (CRT)). The interface circuit P130, thus, typically includes a graphics driver card.

The interface circuit P130 also includes a communication device, such as a modem or network interface card to facilitate exchange of data with external computers via a network (e.g., an Ethernet connection, a digital subscriber line (DSL), a telephone line, coaxial cable, a cellular telephone system, etc.).

The computer P100 also includes one or more mass storage devices P150 for storing software and data. Examples of such mass storage devices P150 include floppy disk drives, hard drive disks, compact disk drives and digital versatile disk (DVD) drives.

The coded instructions of FIGS. 5-8 may be stored in the mass storage device P150, in the volatile memory P110, in the non-volatile memory P112, and/or on a removable storage medium such as a CD or DVD.

From the foregoing, it will be appreciated that disclosed methods, apparatus, systems and/or articles of manufacture allow a mobile device to determine its own phone number, which is information readily available to a candidate panelist when providing personal and demographic information via a web site hosted by a metering organization. While other unique identification numbers of the mobile device may be available, such as the IMEI number or an ESN, such identification numbers are cumbersome to obtain manually from the candidate panelist, and do not follow the panelist in the event a new and/or alternate mobile device is obtained at a later time.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to conditionally enable a metering application on a mobile device, comprising:
    initializing a metering application on the mobile device to operate with partial functionality;
    parsing a message log with the metering application to identify an installation message;
    extracting a telephone number from the installation message and saving to a memory of the mobile device;
    sending an initialization message based on the extracted telephone number to prompt an authorization message; and
    enabling full functionality of the metering application in response to receiving the authorization message.

2. A method as described in claim 1, wherein the message log comprises at least one of a text message history log and an e-mail history log.

3. A method as described in claim 1, wherein sensor recordings are disabled when the partial functionality is enabled.

4. A method as described in claim 3, wherein the sensor recordings comprise at least one of microphone recording, image recording, global positioning satellite recording, compass recording, or accelerometer recording.

5. A method as described in claim 3, wherein sensor recordings are enabled when the full functionality is enabled.

6. A method as described in claim 1, wherein the metering application is downloaded to the mobile device from at least one of an application repository or a website uniform resource locator.

7. A tangible machine accessible medium having instructions stored thereon that, when executed, cause a machine to, at least:
   initialize a metering application on the mobile device to operate with partial functionality;
   parse a message log with the metering application to identify an installation message;
   extract a telephone number from the installation message and saving to a memory of the mobile device;
   send an initialization message based on the extracted telephone number to prompt an authorization message; and
   enable full functionality of the metering application in response to receiving the authorization message.

8. A tangible article of manufacture as described in claim 7, wherein the instructions, when executed, cause the machine to disable sensor recordings when the partial functionality is enabled.

9. A tangible article of manufacture as described in claim 7, wherein the instructions, when executed, cause the machine to enable sensor recordings when the full functionality is enabled.

10. A tangible article of manufacture as described in claim 7, wherein the instructions, when executed, cause the machine to download the metering application to the mobile device from at least one of an application repository or a website uniform resource locator.

11. An apparatus to conditionally enable a metering application on a mobile device, comprising:
    a metering application on the mobile device to initialize with partial functionality;
    an installation message parser to identify an installation message and extract a telephone number from the installation message; and
    a mobile message generator to send an initialization message based on the extracted telephone number to prompt an authorization message that enables full functionality of the metering application.

12. An apparatus as described in claim 11, wherein the mobile device comprises at least one of a text message history log and an e-mail history log to be parsed by the installation message parser.

13. An apparatus as described in claim 11, further comprising a mobile uniform resource identifier generator to generate the initialization message.

* * * * *